United States Patent [19]

Klein

[11] 4,372,913

[45] Feb. 8, 1983

[54] POLYMERIZATION, AND CORROSION RESISTANCE, ENHANCEMENT BY ACID ADDITION SALTS OF METHACRYLIC ACID AND A 2-MONO (LOWER) ALKYLAMINOETHYL METHACRYLATE OR POLYMERS OF THESE SALTS

[76] Inventor: Max Klein, 257 Riveredge Rd., Tinton Falls, N.J. 07724

[21] Appl. No.: 168,015

[22] Filed: Jul. 14, 1980

Related U.S. Application Data

[63] Continuation-in-part of Ser. No. 903,566, May 8, 1978, Pat. No. 4,212,782, which is a continuation of Ser. No. 674,990, Apr. 8, 1976, abandoned, which is a continuation-in-part of Ser. No. 413,043, Nov. 5, 1975, Pat. No. 3,950,398, which is a continuation-in-part of Ser. No. 15,935, Mar. 2, 1970, abandoned, which is a continuation-in-part of Ser. No. 488,756, Sep. 20, 1965, abandoned.

[51] Int. Cl.$^3$ ............... C23F 11/12; C23F 11/14
[52] U.S. Cl. .................... 422/16; 252/392; 422/17
[58] Field of Search ............ 106/14.15; 252/8.55 E, 252/390, 392; 260/29.6 HN; 422/16, 17

[56] References Cited

U.S. PATENT DOCUMENTS

| | | | |
|---|---|---|---|
| 3,658,710 | 4/1972 | Puckorius et al. | 422/16 |
| 3,950,398 | 4/1976 | Klein | 526/240 |
| 4,209,398 | 6/1980 | Ii et al. | 422/17 |
| 4,212,782 | 7/1980 | Klein | 260/29.6 H |

FOREIGN PATENT DOCUMENTS

| | | | |
|---|---|---|---|
| 45-247 | 1/1970 | Japan | 422/17 |

*Primary Examiner*—Peter A. Hruskoci
*Attorney, Agent, or Firm*—Dann, Dorfman, Herrell and Skillman

[57] ABSTRACT

The resistance of iron and steel to corrosion from contact with water is enhanced by including in the water an agent selected from an acid addition salt of methacrylic acid and a 2-mono (lower) alkylaminoethyl methacrylate, or a polymer of an acid addition salt of methacrylic acid and a 2-mono (lower) alkylaminoethyl methacrylate in an amount effective for enhancing corrosion resistance.

6 Claims, No Drawings

POLYMERIZATION, AND CORROSION RESISTANCE, ENHANCEMENT BY ACID ADDITION SALTS OF METHACRYLIC ACID AND A 2-MONO (LOWER) ALKYLAMINOETHYL METHACRYLATE OR POLYMERS OF THESE SALTS

This application is a continuation-in-part of copending application Ser. No. 903,566 filed May 8, 1978, to issue as U.S. Pat. No. 4,212,782 on July 15, 1980, which is a continuation of earlier copending application Ser. No. 674,990 filed Apr. 8, 1976 (now abandoned), which then was copending with and as a continuation-in-part of my then copending application Ser. No. 413,043 filed Nov. 5, 1975 (now U.S. Pat. No. 3,950,398 on subject matter not claimed in this application), which then was copending with and as a continuation-in-part of my application Ser. No. 15,935 filed Mar. 2, 1970 (now abandoned), which in turn was a continuation-in-part of my then copending with it application Ser. No. 488,756 filed Sept. 20, 1965 and now abandoned.

The present invention relates to a method of enhancing the corrosion resistance of iron and steel when wetted with water, by including dissolved in the water a corrosion resistance enhancing effective amount of (a) an unequal-molar acid addition salt of methacrylic acid and a 2-mono(lower)alkylaminoethyl methacrylate or (b) an addition polymer of an equimolar molar acid addition salt of methacrylic acid and a 2-mono(lower)alkylaminoethyl methacrylate.

The above-mentioned water-soluble, polymerizable, acid addition salts of methacrylic acid and a 2-mono(lower)alkylaminoethyl methacrylate and preparation of these acid addition salts are broadly and specifically described, exemplified and claimed in U.S. Pat. No. 3,950,398 of Apr. 13, 1976. That patent also describes and exemplifies the above referred to water-soluble, free radical addition polymers of equimolar and also unequal-molar, water-soluble acid addition salts of methacrylic acid and a 2-mono(lower)alkylaminoethyl methacrylate. These polymers also are described and exemplified and claimed in U.S. Pat. No. 4,212,782 to issue on July 15, 1980.

The above-described acid addition salts and polymers derived therefrom may also be used for polymerization of monomer to polymer in an aqueous emulsion polymerization using an aqueous redox formulation including ferrous iron comprises including in the aqueous emulsion polymerization medium an amount, effective significantly to enhance the extent of polymerization, of a solid, readily water-soluble, free radical addition polymer of a water-soluble acid addition salt of methacrylic acid and a 2-mono-(lower)alkylaminoethyl methacrylate whose lower alkyl group has up to 6 carbons and is straight or branched chain or cyclic, wherein the methacrylic acid and the mono-alkylaminoethyl methacrylate moieties are linked to one another by addition at the respectively original vinyl group of each of them and present in the ratio of about 1 mol of one of them per mol of the other, and which polymer is insoluble in butane, pentane and hexane each at below its boiling point, resists fusion at a temperature up to at least about 315° C., and in aqueous media manifests amphoteric activity.

The enhancement of emulsion polymerization portion of the invention is illustrated by such polymerization of styrene, but not restricted to it, as follows:

EXAMPLE 1

Enhancement Of Emulsion Polymerization (a) 120 ml. of commercial spring water, 1.5 grams of the solid, readily water-soluble, free radical polymer of the water-soluble, equimolar acid addition of methacrylic acid and 2-(mono-tertiary-butylamino)ethyl methacrylate (product of Example 7 of U.S. Pat. No. 3,950,398), which polymer is briefly called the part (a) polyampholyte, 0.4 gram each of ammonium persulfate and of sodium metabisulfite, 2 grams of ferrous sulfate solution (of 0.3 gram ferrous sulfate per 100 ml. water), and 60 grams of styrene (monomer) were loaded into an 8 ounce heavy-walled, narrow-neck glass pressure bottle and pressure-tightly sealed in it by an aluminum inner-lined cork insert metal cap mechanically secured by pressure crimping to the bottle neck.

(b) Another such bottle was prepared with the same content except that 0.5 gram of its part (a) polyampholyte was replaced by 0.5 gram of a commercial soap powder (Procter & Gamble's 'IVORY SNOW' soap powder).

(c) A third such bottle was prepared with the entire 1.5 grams of the part (a) polyampholyte replaced by 1.5 grams of that 'IVORY SNOW' powder.

Each of the three bottles was mounted for rotation at 40 r.p.m. about an axis normal to its longitudinal axis and intermediate its ends and horizontally spaced apart and rotated at the same time in a water-bath maintained at 120° F. for three hours. These bottles then were allowed to cool, and the respective following percentages of conversion of the styrene to polystyrene were determined:

| | | |
|---|---|---|
| (a) using polyampholyte | 1.5 gm. | 100%; |
| (b) using polyampholyte and | 1. gm. | } 55.4%; and |
| using 'IVORY SNOW' soap powder | 0.5 gm. | |
| (c) using 'IVORY SNOW' soap powder | 1.5 gm. | 48%. |

These results show that the part (a) polyampholyte so enhanced the emulsion polymerization of styrene as to provide complete (i.e. 100%) conversion to polystyrene in the period in which the other two emulsification agents allowed only 55.4% and 48% conversion respectively.

Example 1 can be repeated by separately respectively replacing its part (a) polymer by the corresponding amount of each other such polymer respectively similarly obtained by replacing the 2-(mono-tertiary-butylamino)ethyl methacrylate of the part (a) polymer by the same molar quantity of each of the other acid addition salts of methacrylic acid and a 2-mono(lower)alkylaminoethyl methacrylate with the lower alkyl group having up to six carbon atoms and being straight or branched chain or cyclic, namely, 2-(mono)methylaminoethyl methacrylate, 2-(mono)ethylaminoethyl methacrylate, 2-(mono)propylaminoethyl methacrylate 2-(mono)isopropylaminoethyl methacrylate, 2-(mono)n-amylaminoethyl methacrylate, 2-(mono)isoamylaminoethyl methacrylate, and 2-(mono)-hexylaminoethyl methacrylate, and thereby respectively providing in the same way the corresponding addition polymer of the equimolar addition salt of methacrylic acid and each of these just above-named 2-mono(lower)alkylaminoethyl methacrylate.

Each of these thereby resulting further examples of emulsion polymerization with the various equimolar addition polymers said in the just immediately preceding paragraph to be provided by repeating Example 1 with the respectively described replacement is to be considered as if it is written out in full herein (so as to avoid unnecessarily extending the disclosure).

Broadly considered the method of enhancing the extent of solution copolymerization of at least two copolymerizable monomers capable of being polymerized in an organic solvent medium wherein the selected monomers can be held in solution comprises including in the solution polymerization medium an amount, effective to enhance the extent of polymerization, of a solid, water-soluble polymerizable methacrylic acid addition salt of a 2-mono(lower)alkylaminoethyl methacrylate wherein the alkyl group has up to about 6 carbons and the methacrylic acid and the aforesaid methacrylate components are present in the salt with the ratio of about one mole of the acid per mol of the methacrylate.

This method part of the invention more specifically is applicable, for example, in the solution copolymerization of styrene and acrylonitrile, which solution polymerization is illustrated by, but not restricted to, use of the equimolar acid addition salt having as its methacrylate component a 2-(mono-butylamino)ethyl methacrylate as in the following examples:

EXAMPLE 2

Solution Co-polymerization Of Styrene And Acrylonitrile with Equimolar Acid Addition Salt 120 ml. of styrene, 28 ml. of acrylonitrile, 200 ml. of methyl ethyl ketone, 180 ml. of xylene, 3 ml. of tricresyl phosphate, and 3 ml. of butyl benzyl phthalate were mixed in a liter beaker, and into their mixture 0.6 grams of alpha, alpha'-azo-bis-isobutyronitrile and 0.02 gram of benzoyl peroxide were uniformly admixed.

Seven grams of the finely divided equimolar acid addition salt of methacrylic acid and 2-(mono-tertiary-butylamino)ethyl methacrylate (e.g. prepared as in Example 1 of U.S. Pat. No. 3,950,348) were placed in a stainless steel pressure reactor, to which was added 225 ml. of the just described solution of the monomers styrene and acrylonitrile in the solvents methyl ethyl ketone and xylene, with the included phosphate and phthalate plasticizers and the nitrile and peroxide catalysts.

The reactor was sealed with its cap screwed pressure-tightly over the outside threads of its neck with a teflon-tape seal between the cap and the threads. The reactor was rotated about its own axis in a water bath maintained at 160° F. (70.1° C.), for 16 hours to obtain substantially complete conversion.

The resulting styrene-acrylonitrile copolymer solution in the methyl ethyl ketone and xylene is a transparently clear coating lacquer. Application of single coatings of this lacquer over metal surfaces, especially non-ferrous metals as copper, brass, bronze, as well as over iron, steel and ferrous metal surfaces, after evaporation of the solvents and without subsequent baking, left them with a strongly adhesive clear transparent continuous thin film which protected and preserved their bright clean original surfaces from atmospheric change for long extended periods, such as even a couple of years or more as with the copper.

Other variations and applications of the coating lacquer of this example occur further below.

While the styrene and acrylonitrile are used in the foregoing example in the ratio of about 5 parts of styrene to one of acrylonitrile, their ratios can be varied. For example, the acrylonitrile may be reduced possibly to even half of its proportion. Alternatively, the acrylonitrile may be increased toward equal to the styrene and also can exceed it even to about five times the styrene. However, as the acrylonitrile ratio is increased up to about equal the styrene, to avoid turbidity or other evidence of inadequate acrylonitrile solution the xylene ought to be replaced, initially at least in part and otherwise as a whole, by dimethylformamide and/or dimethyl sulfoxide.

It is advantageous generally to retain the azo-bis-diisobutyronitrile catalyst. However, the benzoyl peroxide catalyst may be entirely omitted or replaced in part or as a whole by cumene hydroperoxide and/or tertiary-butyl hydroperoxide or di-(tertiary)butyl hydroperoxide, or any other free-radical type catalyst suitable to the polymerization conditions used.

While for certain applications of a coating lacquer formulation like that of Example 2, such as the above-mentioned protective coating of metal surfaces, the plasticizer may be omitted, in other applications only tricresyl phosphate was used in a proportion equal to that of both of the plasticizers in that formulation. However, in working with this modification for some other uses, the tricresyl phosphate indicated tendency of bleeding or migration. This undesirable tendency was avoided when the tricresyl phosphate was replaced up to, say, about 50% by a plasticizer such as butyl benzyl phthalate or dioctyl phthalate and the like. Their joint use was found to provide a more stable and higher gloss to the finished film than that obtained with tricresyl phosphate alone.

The methyl ethyl ketone could be used alone without xylol, but the latter and/or toluene reduces the cost by up to possibly as much as 60%. That ketone also could be replaced in part or as a whole by any other suitable ketone solvent such as methyl isobutyl ketone, diethyl ketone, diisobutyl ketone, ethyl butyl ketone, methyl n-amyl ketone, methyl isoamyl ketone, or methyl propyl ketone, depending on the various drying conditions. Such other variations in the Example 2 formulation provide other transparent coating lacquers with corresponding variations in properties.

A further variation of the possibility of enhancing the solution co-polymerization of styrene and acrylonitrile involving including another polymerizable substance is shown by, but not restricted to, the following illustrative example also of a pigmented coating:

EXAMPLE 3

Pigmented Coating Based On Styrene, Acrylonitrile, Styrene-butadiene, And Equimolar Acid Addition Salt 8 pounds of the equimolar acid addition salt used in Example 2, 72 lbs. of styrene, 16 lbs. of acrylonitrile, 30 lbs. of 10% GRS 1006 rubber solution, 16 lbs. of tetrahydrofuran, 9 gallons of xylene, 8 gallons of methyl ethyl ketone, 13 lbs. of 4-methoxy-4-methylpentanone-2, 13 lbs. of 'CYCLOSOL No. 53' (Shell Chemical Company's mixed solvent aromatics), 6 lbs. of mineral oil (medium) USP, 6 lbs. tricresyl phosphate, 6 lbs. butyl benzyl phthalate, 80 lbs. titanium dioxide (pigment RA51, Titanium Corp'n of America), 10 lbs. 'OPTI- WHITE' (Burgess Pigment Corp'n, Sandersville, Ga.) anhydrous aluminum silicate, 180 grams azo-bis-isobutyronitrile, 4.5 grams of benzoyl peroxide, 4.5 grams di-(tertiary)butyl catechol, 4.5 grams of trinonyl phosphite, 360 grams of lecithin (syrup), and 110 lbs. of flintstone grinding pebbles were loaded into a cylindrical pressure reactor having a bolted on cap on each end, with its longitudinal axis being about three times its diameter.

This reactor was removably mounted for rotation about an axis diametrically normal to the middle of its longitudinal axis, and rotatably supported by its rotation shaft extending diametrically oppositely outwardly from the cylinder wall of the reactor and along its axis of rotation. As so mounted and submerged in a water tank maintained at a polymerization temperature of 174° F. (79° C.) ($\pm 2.5°$ F.), the reactor was rotated slowly (e.g. 3 r.p.m.) for a time sufficient for the conversion to be completed - 18 hours.

The rotation then was interrupted and there was added 3 gallons of an epoxy resin solution composed of 32 lbs. of 'EPON 1001' and 4 lbs. of 'EPON 828' (both epoxy resins of Shell Chemical Co., New York, N.Y.), 70 lbs. each of xylene and tetrahydrofuran and a half gallon dimethylformamide, and resumed for long enough (25 minutes or so) to affect their uniform admixture.

The product as thus completed is effective as an advantageous quick-drying final coating for various applications to provide high hiding power, flexibility, strong adhesion and abrasion resistance, with extensive corrosion and weather resistance. For other applications this product was diluted with compatible solvents, such as equal parts (by weight) of xylene and methyl ethyl ketone, to provide the specifically suitable viscosity for the particular use, for example, 20 seconds Zahn cup.

These pigmented co-polymerized styrene-acrylonitrile coatings are not to be restricted to the exact formulation of Example 3. Variations in its monomers, solvents, catalyst, plasticizer, antioxidant, and diluents can be made as described in relation to Example 2. Other compatibly suitable white or other color pigments, e.g. aluminum and/or also zinc powders, or the wide range of the different iron oxide pigments can replace the titanium dioxide in part or as a whole.

The lecithin provided a significant and stable plasticizing effect on these pigment-bearing polymers prepared with styrene in addition to enhancing wetting of the pigment by the organic polymer and solvent system and providing improved pigment dispersion and stability of particle distribution.

The equimolar acid addition salt of any of Examples 2 and 3 can be replaced in part or as a whole by any of the other equimolar acid addition salts of methacrylic acid and any other 2-mono-(lower)alkylaminoethyl methacrylate described in the third paragraph of Example 1 above. Each of the thereby resulting further examples of solution polymerization using such an equimolar acid addition salt as a replacement in repeating each of Examples 2 and 3 as just referred to is to be considered as if it is written out in full herein to avoid making this disclosure prolix.

Due to their polyamphoteric character the addition polymers of the acid addition salts described and claimed in U.S. Pat. No. 3,950,398 (which polymers are described in that patent and described and claimed in U.S. Pat. No. 4,212,782), for example, the addition polymers of an equimolar acid addition salt, are useful to sequester a polyvalent metal cation, such as the ferric ion, over a wide pH range as at pH 11 to as low as at pH 2, and even in the presence of sea water.

The polyamphoteric character of this equimolar acid addition salt polymer is shown by the typical dual peaks (one on the acid side and the other on the alkaline) separated by the trough between them—on plotting its viscosity versus pH. As indicated above, these polymers are useful in enhancing the corrosion resistance of iron and steel in contact with water.

Similar utility as in enhancing the corrosion resistance of iron, can be found with the aforementioned addition salt polymers wherein the ratio of the methacrylic acid moiety to that of the secondary-aminoethyl methacrylate differs from one to one.

In its broad aspect the method of enhancing the corrosion resistance of iron when contacted with water comprises including dissolved in the water a corrosion resistance of iron effective amount of a corrosion resistance enhancing agent which is any of (a) an unequal-molar acid addition salt of methacrylic acid and a 2-mono(lower)alkylaminoethyl methacrylate and (b) a solid, readily water-soluble, free radical addition polymer of a water-soluble acid addition salt of methacrylic acid and a 2-mono(lower)alkylaminoethyl methacrylate whose lower alkyl group has up to 6 carbons and is straight or branched chain or cyclic, and wherein the methacrylic acid and the mono-alkylaminoethyl methacrylate moieties are linked to one another by addition at the respectively original vinyl group of each of them and present in the ratio of about 1 mol of one of them per mol of the other, and which polymer is insoluble in butane, pentane and hexane each at below its boiling point, resists fusion at a temperature up to at least about 315° C., and in aqueous media manifests amphoteric activity.

The polyamphoteric character of the aforesaid polymers and enhancement of corrosion resistance by use of the acid addition salts or polymers of them is illustrated by, but not restricted to, the following examples:

EXAMPLE 4

Corrosion Resistance Enhanced By Unequal Acid Addition Salt (a) On dissolving methacrylic acid in water having steel wool immersed in it, the characteristic bubbling occurred at the steel wool surfaces from the hydrogen evolution following attack on the steel wool by that acid. However, no bubbling occurred when steel wool was immersed (and even agitated) in water when either the excess acid or the excess-ester unequal acid addition salt of Examples 2 and 3 respectively of U.S. Pat. No. 3,950,398 was dissolved in the water.

(b) Also, when 1 gram of steel wool was immersed in 50 ml. of water, rust developed in 4 hours. Then too, when 1 gram of steel wool was immersed in each of two 50 ml. portions of water one containing dissolved in it 0.5 gram of glacial methacrylic acid and the other containing dissolved in it 0.5 gram of a mono-(tertiary)-butylaminoethyl methacrylate, in each case the solution turned light tan within 12 hours.

However, when the water contained dissolved in it instead only 0.5 gram of the 50% excess-acid in the one case, and in the second case 0.5 gram of the excess-ester, acid addition salt of U.S. Pat. No. 3,950,398 Example 2e (of its column 6 lines 5–9) or 3v (same patent column 6 lines 38–43), the solution was still clear even beyond at least 24 hours so far as then tested. Then too, there was no evolution of hydrogen gas from the immersion of the steel wool in the solution of the excess-acid addition salt.

Each part of Example 4 can be repeated by replacing its respective amount of its specific excess-acid or excess-ester acid addition salt used by the corresponding, or other effective, amount of each of the other excess-acid or excess-ester acid addition salts described in Examples 2 and 3 to column 7 line 3, of and as claimed in, U.S. Pat. No. 3,950,398. Each thus resulting additional example is to be considered as if thereby appearing written out in full herein to avoid unnecessarily extending this specification.

EXAMPLE 5

Sequestration Manifested By Equimolar Acid Addition Salt Polymer (a) Immersion of 0.5 gram of steel wool in a 1% aqueous solution of the equimolar methacrylic acid and 2-(mono-tertiary-butylamino)ethyl methacrylate addition salt (as used in Example 1 above) polymer avoided precipitation of any iron hydroxide or oxide at from ambient temperature even to heating at 150° F. (65.6° C.) for a couple of hours and then showed only a yellowish to amber clear solution. On the other hand, the control sample (without any dissolved polymer) showed a brownish precipitate within 2 hours at 150° F. (65.6° C.).

(b) Addition of sodium hydroxide to pH 11 produced no precipitate in the aqueous sample containing 1% of the same equimolar acid addition salt polymer with 0.5 gram of immersed steel wool. Addition of hydrochloric acid to give pH 2 to 100 ml. of the 1% aqueous solution of the same polymer with 0.5 gram of steel wool immersed in it after 10 days showed only a slight yellowish discoloration and no precipitate. In the control sample which contained no polymerized equimolar acid addition salt, the steel wool was completely dissolved in 4 days.

(c) A jar of sea water with a steel nail immersed in it showed a brownish precipitate of iron oxide within 4 hours. Yet a similar jar with 1% of this same polymerized equimolar acid addition salt dissolved in the sea water remained stable without change over a test period extended to 3 months.

Example 5 can be repeated by replacing its equimolar methacrylic acid and 2-(mono-tertiary-butylamino)ethyl methacrylate addition salt polymer by an equal or otherwise similarly effective concentration of any of the other such polymers as described in the third paragraph of Example 1 above. Then each of the thereby resulting further examples like Example 5 also is to be considered as if appearing written out in full herein thereby avoiding making this specification prolix.

While the invention has been explained with reference to certain specific embodiments of it, it is understood that various substitutions and modifications can be made in the described embodiments within the scope of the appended claims which are intended also to cover equivalents of these embodiments.

What is claimed is:

1. A method for enhancing the corrosion resistance of iron or steel when contacted with water having a pH of about 2 to about 11, which method comprises dissolving in said water, in an amount effective for enhancing corrosion resistance, an agent selected from the group consisting of (a) an acid addition salt of methacrylic acid and a 2-mono(lower)alkylaminoethyl methacrylate said lower alkyl group being straight or branched chain, or cyclic, and having up to 6 carbons, the methacrylic acid and the 2-mono(lower)alkylaminoethyl methacrylate components being present in said salt in the ratio of from about 1 to about 1.5 moles of one per mole of the other and (b) a solid, free radical addition polymer of an acid addition salt of methacrylic acid and a 2-mono(lower)alkylaminoethyl methacrylate, said lower alkyl group being defined as above, wherein the methacrylic acid and the monoalkylaminoethyl methacrylate moieties are linked to one another by addition at the respectively original vinyl group of each of them and present in the ratio of about 1 mole to about 1.5 moles of one of them per mole of the other, and which polymer is insoluble in pentane at below its boiling point and in aqueous media manifests amphoteric activity.

2. The method as claimed in claim 1, wherein the methacrylate moiety is 2-(mono-butylamino)ethyl methacrylate, and the polymer also is insoluble in butane or hexane below its boiling point and resists fusion at a temperature up to at least about 315° C.

3. The method as claimed in claim 2, wherein said methacrylate moiety is 2-(mono-tertiary-butylamino)ethyl methacrylate.

4. The method as claimed in claim 2 or 3, wherein the corrosion resistance enhancing agent is an acid addition salt.

5. The method as claimed in claim 2 or 3, wherein the corrosion resistance enhancing agent is an addition polymer of methacrylic acid and the 2-mono(lower)alkylaminoethyl methacrylate.

6. The method as claimed in claim 1 wherein the corrosion resistance enhancing agent is the addition polymer of methacrylic acid and 2-mono(lower)alkylaminoethyl methacrylate in the mole ratio of about 1 mole of one per mole of the other.

* * * * *